(12) United States Patent
Priel et al.

(10) Patent No.: US 9,934,002 B2
(45) Date of Patent: Apr. 3, 2018

(54) TECHNOLOGY RECOMMENDATION FOR SOFTWARE ENVIRONMENT

(71) Applicant: HEWLETT PACKARD ENTERPRISE DEVELOPMENT LP, Houston, TX (US)

(72) Inventors: Tomer Priel, Yehud (IL); Karen Cohen, Yehud (IL); Eli Mordechai, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 15/028,735

(22) PCT Filed: Oct. 30, 2013

(86) PCT No.: PCT/US2013/067517
§ 371 (c)(1),
(2) Date: Apr. 12, 2016

(87) PCT Pub. No.: WO2015/065372
PCT Pub. Date: May 7, 2015

(65) Prior Publication Data
US 2016/0266874 A1 Sep. 15, 2016

(51) Int. Cl.
*G06F 9/44* (2006.01)
*G06F 9/45* (2006.01)
(Continued)

(52) U.S. Cl.
CPC .................. *G06F 8/20* (2013.01); *G06F 8/00* (2013.01); *G06F 9/4446* (2013.01); *G06F 17/00* (2013.01);
(Continued)

(58) Field of Classification Search
CPC ............ G06F 8/00–8/20; G06F 9/4446; G06F 17/00; G06N 5/02; G06Q 10/04; G06Q 30/0631
See application file for complete search history.

(56) References Cited

U.S. PATENT DOCUMENTS 5,269,014 A * 12/1993 Ogino ........................ G06F 8/00
703/22
6,763,342 B1 7/2004 Mattern et al.
(Continued)

FOREIGN PATENT DOCUMENTS

CN 1834908 A 9/2006
KR 20130101222 A 9/2013

OTHER PUBLICATIONS

Francis Palma, Recommendation System for Design Patterns in Software Development an DPR Overview, pp. 1-5, 2012 (Year: 2012).*
(Continued)

*Primary Examiner* — Thuy Dao
*Assistant Examiner* — Mongbao Nguyen (57) ABSTRACT

A method includes receiving, by a computer, input from a client device. The input is indicative of a software environment for software to be developed by a user. The method further includes analyzing, by the computer, the received input against a knowledge base to generate a technology recommendation for the user to use to develop the software. The method also includes providing, by the computer, the technology recommendation to the client device.

12 Claims, 7 Drawing Sheets

(51) Int. Cl.
G06F 9/445 (2006.01)
G06F 17/00 (2006.01)
G06Q 10/04 (2012.01)
G06N 5/02 (2006.01)
G06Q 30/06 (2012.01)

(52) U.S. Cl.
CPC .............. *G06N 5/02* (2013.01); *G06Q 10/04* (2013.01); *G06Q 30/0631* (2013.01)

(56) References Cited

U.S. PATENT DOCUMENTS

| | | | | |
|---|---|---|---|---|
| 6,976,067 | B2* | 12/2005 | Gusler | G06F 9/4446 709/205 |
| 7,401,031 | B2 | 7/2008 | Hughes | |
| 7,418,447 | B2 | 8/2008 | Caldwell et al. | |
| 7,546,577 | B2* | 6/2009 | Do | G06F 8/20 717/108 |
| 8,250,532 | B2 | 8/2012 | Guyette | |
| 8,332,394 | B2* | 12/2012 | Fan | G06F 17/30654 707/723 |
| 8,468,110 | B1* | 6/2013 | Podgorny | G06F 11/3438 706/45 |
| 8,494,978 | B2* | 7/2013 | Pinckney | G06N 99/005 706/11 |
| 8,615,755 | B2* | 12/2013 | Gargash | G06F 11/3051 709/217 |
| 8,788,356 | B2* | 7/2014 | Georgis | G06F 8/61 705/14.4 |
| 8,938,708 | B2* | 1/2015 | DeLuca | G06F 8/71 717/101 |
| 9,021,416 | B2* | 4/2015 | Grechanik | G06F 8/36 707/708 |
| 9,070,087 | B2* | 6/2015 | Hatami-Hanza | G06N 5/04 |
| 9,129,038 | B2* | 9/2015 | Begel | |
| 9,572,647 | B2* | 2/2017 | Couse | G01K 1/20 |
| 9,594,594 | B2* | 3/2017 | Schmit | G06F 9/5044 |
| 2006/0129972 | A1* | 6/2006 | Tyburski | G06F 8/61 717/106 |
| 2007/0094219 | A1* | 4/2007 | Kipersztok | G06Q 10/04 706/52 |
| 2008/0103936 | A1* | 5/2008 | Churlik | G06Q 30/02 705/26.41 |
| 2008/0133500 | A1 | 6/2008 | Edwards et al. | |
| 2008/0227063 | A1* | 9/2008 | Kenedy | G06Q 40/00 434/219 |
| 2008/0255696 | A1* | 10/2008 | Chaar | G06F 8/10 700/108 |
| 2008/0313124 | A1* | 12/2008 | Arseneault | G06N 99/005 706/50 |
| 2009/0113400 | A1* | 4/2009 | Pelleg | G06F 11/3466 717/130 |
| 2009/0119637 | A1 | 5/2009 | Ganapathy | |
| 2009/0287678 | A1* | 11/2009 | Brown | G06F 17/30654 |
| 2009/0292687 | A1* | 11/2009 | Fan | G06F 17/30654 |
| 2010/0211924 | A1* | 8/2010 | Begel | G06F 8/74 717/101 |
| 2011/0083127 | A1* | 4/2011 | Georgis | G06F 8/61 717/173 |
| 2012/0072968 | A1* | 3/2012 | Wysopal | G06F 11/3612 726/1 |
| 2012/0078873 | A1* | 3/2012 | Ferrucci | G06N 5/02 707/708 |
| 2012/0079449 | A1 | 3/2012 | Sanderson et al. | |
| 2012/0159441 | A1 | 6/2012 | Ghaisas | |
| 2012/0209663 | A1 | 8/2012 | Gaskins, Jr. et al. | |
| 2012/0290560 | A1* | 11/2012 | Das | G06F 8/71 707/722 |
| 2012/0331440 | A1* | 12/2012 | Meermeera | G06F 8/36 717/101 |
| 2013/0060785 | A1* | 3/2013 | Sweeney | G06N 5/00 707/748 |
| 2013/0159404 | A1* | 6/2013 | Pfaff | G06F 17/30867 709/204 |
| 2014/0052680 | A1* | 2/2014 | Nitz | G06N 5/02 706/46 |
| 2014/0143750 | A1* | 5/2014 | Gangadharan | G06F 8/10 717/102 |
| 2014/0337372 | A1* | 11/2014 | Lee | G06F 8/30 707/767 |

OTHER PUBLICATIONS

Luca Ponzanelli, Leveraging Crowd Knowledge for Software Comprehension and Development, pp. 57-65, 2013 (Year: 2013).*
Will Haines, Recommendations for End-User Development, pp. 42-48, 2010 (Year: 2010).*
Peter Clark, Enabling Domain Experts to Convey Questions to a Machine: A Modified, Template-Based Approach, 2003, pp. 1-7. https://pdfs.semanticscholar.org/05a7/8c9daf602e950112842a3eebe78be1e7f1c7.pdf (Year: 2003).*
Johan Aberg, Collection and Exploitation of Expert Knowledge in Web Assistant Systems, 2001, pp. 1-10. http://ieeexplore.ieee.org/stamp/stamp.jsp?tp=&arnumber=927089 (Year: 2001).*
Fia, Software Development and Change Management Recommendations, 2012, pp. 1-8 https://secure.fia.org/downloads/software_change_management.pdf (Year: 2012)*
Doolittle, J. et al., "Building a Mobile Application Development Framework," Intel, Aug. 2012, 8 pages, available at http://www.intel.in/content/dam/www/public/us/en/documents/best-practices/mobile-app-development-framework.pdf.
International Search Report & Written Opinion received in PCT Application No. PCT/US2013/067517, dated Jul. 29, 2014, 15 pages.
Verbert, K. et al., "Context-aware Recommender Systems for Learning: A Survey and Future Challenges," IEEE Transactions on Learning Technologies 5.4, Jan. 2007, 20 pages.

* cited by examiner

TECHNOLOGY RECOMMENDATION FOR SOFTWARE ENVIRONMENT

CROSS-REFERENCE TO RELATED APPLICATION

This application is a U.S. National Stage Application of and claims priority to international Patent Application No. PCT/US2013/067517, filed on Oct. 30, 2013, and entitled "TECHNOLOGY RECOMMENDATION FOR SOFTWARE ENVIRONMENT," the entire content of which is hereby incorporated in its entirety.

BACKGROUND

Over the past few years, an increasing number of technologies and frameworks for web and mobile development has been explored and researched, such as a software application for a mobile device or a personal desktop computer, or any kind of a computing device. This booming development leads to a variety of choices for a developer or a business to develop a new software application.

BRIEF DESCRIPTION OF THE DRAWINGS

For a detailed description of various examples, reference will now be made to the accompanying drawings in which.

DETAILED DESCRIPTION

The use of software applications for web sites, mobile devices and desktop computers has gained attention in recent years. To stay abreast with the trend, a large number of technologies to develop such software applications have increased. More specifically, to develop a software application, there are a variety of choices on technologies to use, such as the type of device on which the application is to execute, an operating system, whether real time tracking of online data is desired, etc. However, in order to develop a software application to help guide the decisions on the various technology components on which the application may be based, a developer may resort to consulting colleagues, investigating online forums, and searching online libraries. Because of the large number of technological resources, it may be time-consuming for the developer to develop the software applications, and thus economically wasteful for a business. The disclosed implementations provide an efficient design for developers to develop software applications by receiving a developer's requirements to develop the software applications, or so called software environment, and to automatically recommend a software technology choice to use to develop the software application.

Figure 1:
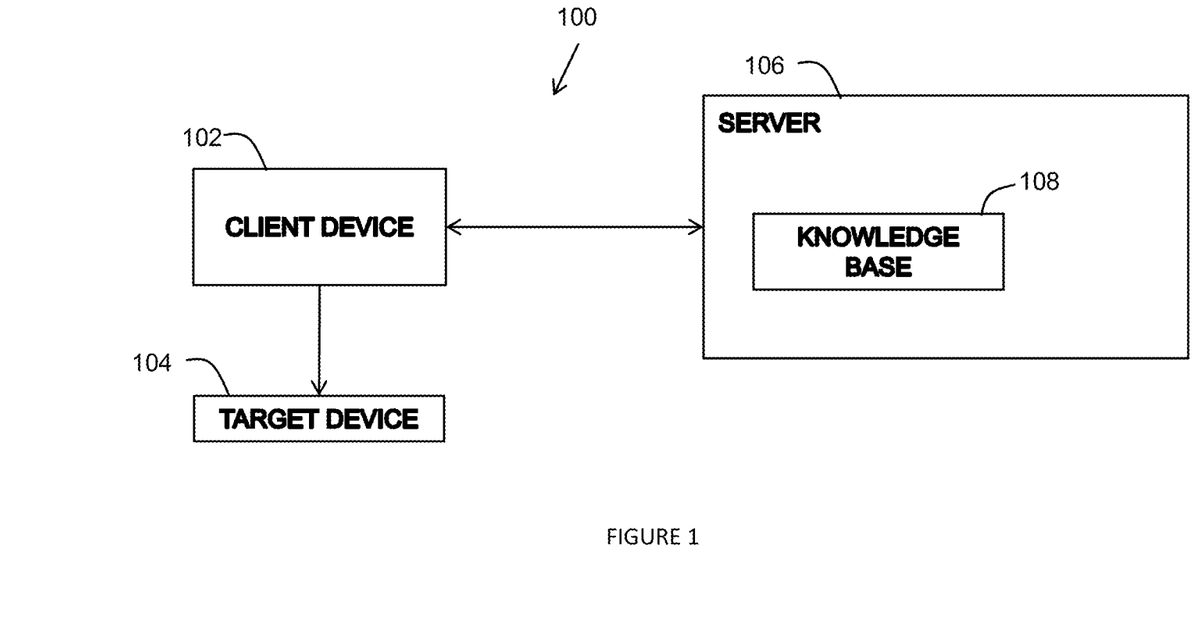
FIG. 1 shows a block diagram of an interactive system in accordance with an implementation.

FIG. 1 shows a block diagram of an interactive system 100 in accordance with an implementation. The system 100 includes a client device 102, a target device 104 and a server 106. The server 106 comprises a knowledge base 108. The client device 102 may communicate with the server 106 via one or more wired and/or wireless interfaces. The client device 102 and the server 106 may communicate within a network. Alternatively or additionally, the client device 102 and the server 106 may reside in respective networks.

The client device 102 may be implemented as a computer (e.g., laptop, desktop, etc.) and may be used to develop an application to be run on the target device 104. The client device 102 interacts with the server 106 to receive technology recommendations on which to base the application to be developed. In the example shown in FIG. 1, the client device 102 is a separate computing device from the target device 104. However, in other implementations, the user can use target device 104 itself to write the application. That is, the functionality attributed herein to the client device 102 may be implemented on the target device 104. The target device 104 is the device on which the application to be developed will execute. The target device may be any suitable type of device such as a mobile device (e.g., a smart phone, a laptop computer, a tablet device), a desktop computer, a computer (e.g., a server) on which a web application is to run, etc.

In some embodiments, the technology recommendations may include a software framework, a software development language, a software protocol, and a software platform, which provide a guide to the user to develop the application. As such, the user may follow the guide and develop the application according to the user's requirements at an economic cost, thus making the development more efficient for the developer and the corresponding business.

Referring to FIG. 1, the client device 102 is configured to receive input from a user who intends to develop a software application for the target device 104. The input received from the user may take various forms, including a query tree or via a graphical user interface (GUI), which will be explained in detail below.

The knowledge base 108 may include any suitable type of online library, forums, or database, which may continuously update the latest technologies associated with software application development, and/or may be manually updated by the users or developers.

The server 106 is configured to analyze the input from the user against the knowledge base 108, and generate a report to be transmitted to the client device 102. The report provided by the server 106 includes a technology recommendation for the user to use for developing the software application.

Figure 2:
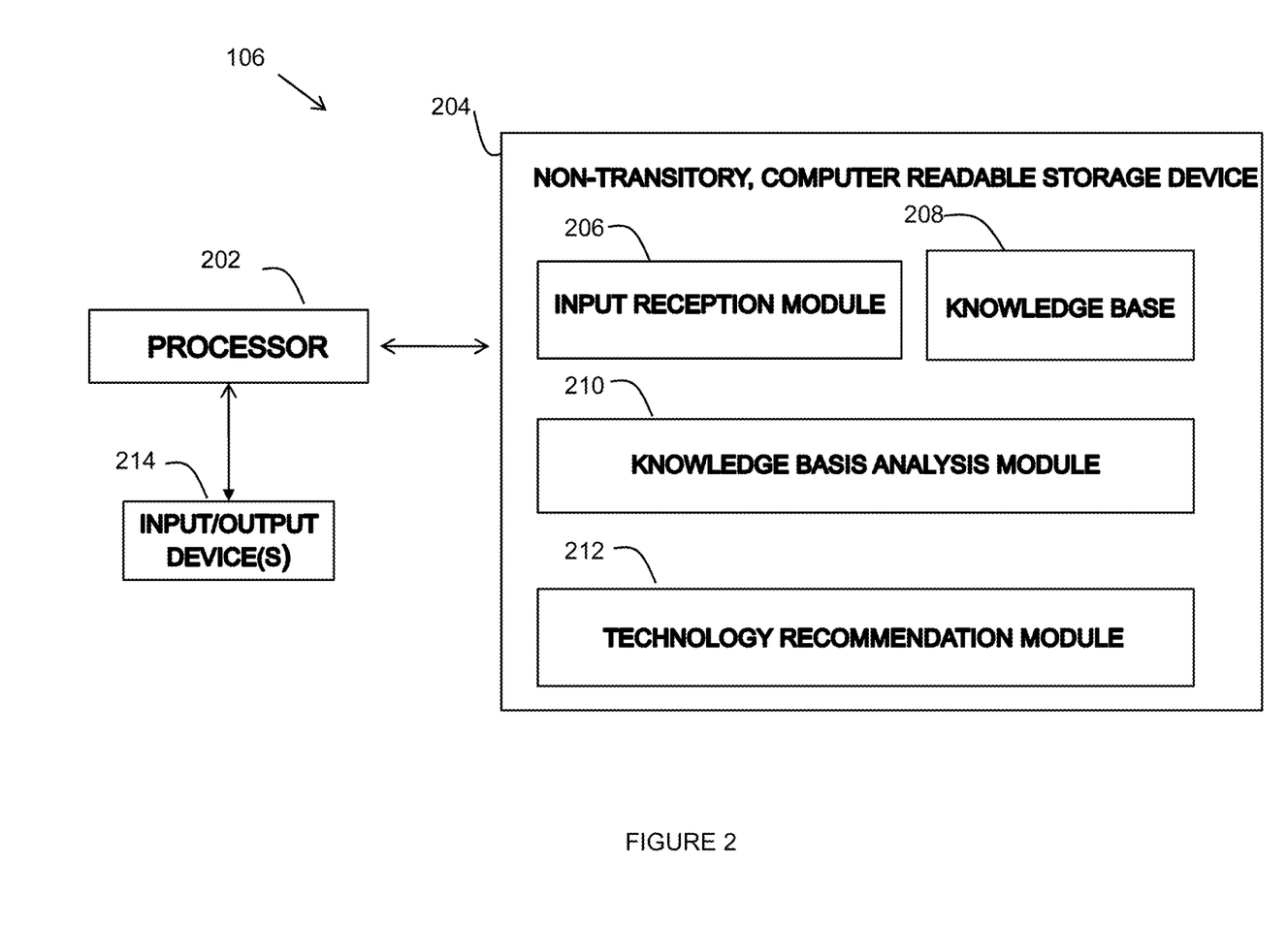
FIG. 2 shows an example of a server in accordance with an implementation.

FIG. 2 shows a suitable example of the server 106 in which a processor 202 is coupled to a non-transitory, computer-readable storage device 204. Input and output devices 214 may also be included and coupled to the processor. The non-transitory, computer-readable storage device 204 may be implemented as volatile storage (e.g., random access memory), non-volatile storage (e.g., hard disk drive, optical storage, solid-state storage, etc.) or combinations of various types of volatile and/or non-volatile storage.

As shown in FIG. 2, the non-transitory, computer-readable storage device 204 includes an input reception module 206, a knowledge base 108, a knowledge basis analysis module 210, and a technology recommendation module 212. Each module of FIG. 2 may be executed by the processor 202 to implement the functionality described herein attributed to the server 106. The functions to be implemented by executing the modules 206, 210 and 212 will be described with reference to the flow diagrams of FIG. 6.

Figure 3:
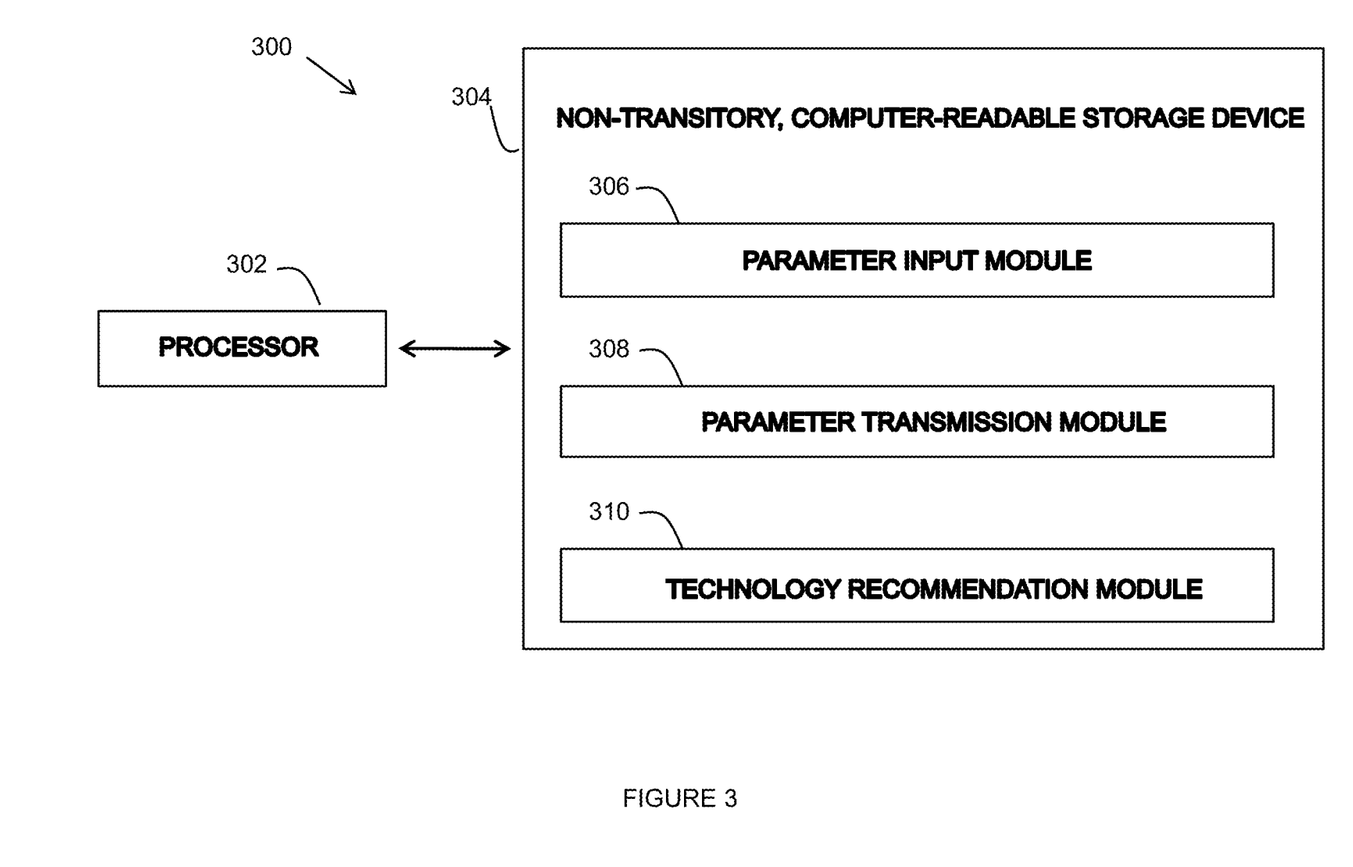
FIG. 3 shows an example of a client device in accordance with an implementation.

FIG. 3 shows an example of the client device 102 in accordance with an implementation. The client device 102 includes a processor 302 and a non-transitory, computer-readable storage device 304 coupled to the processor 302. The non-transitory storage, computer-readable device 304 may be implemented as volatile storage (e.g., random access memory), non-volatile storage (e.g., hard disk drive, optical storage, solid-state storage, etc.) or combinations of various types of volatile and/or non-volatile storage.

Further, the processor 302 is configured to execute a plurality of software modules (e.g., parameter input module 306, parameter transmission module 308, technology recommendation reception module 310) stored in the non-transitory, computer-readable storage device 304, to implement the functions described herein as attributed to the client device 102. More particularly, the processor 302 is configured to execute the parameter input module 306 to receive a parameter from the user, which indicates a feature of a software environment for the software application to be developed by the user. The processor 302 also executes the parameter transmission module 308 to transmit the received parameters to the server 106. Still more particularly, the technology recommendation reception module 310 is executed by the processor 302 to receive the technology recommendation provided by the server 106 and to provide (e.g., display) the recommendation to the user of the client device 102. In some implementations, the modules 306-310 may be implemented as standalone software modules. The modules 306-310 may be combined together as a one piece of software in other implementations. Further still, the software modules 306-310 may be implemented as a web browser.

Figure 4:
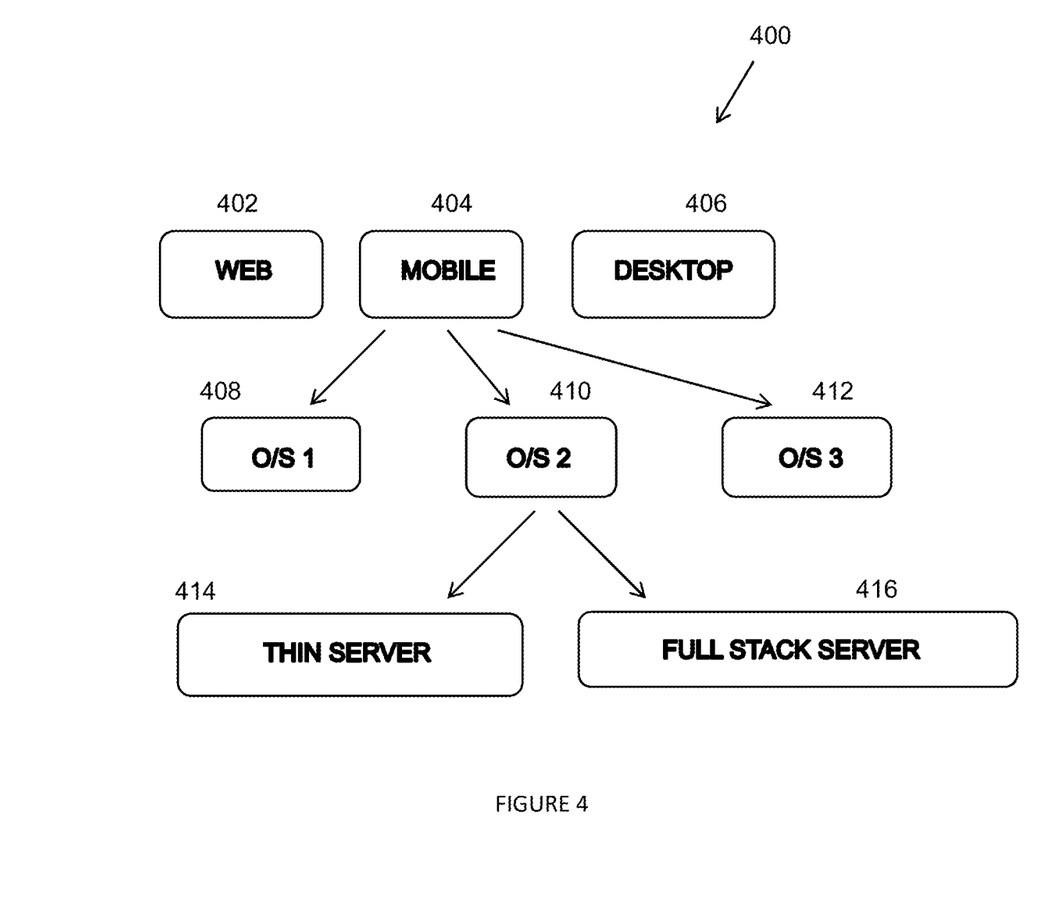
FIG. 4 shows a schematic diagram of an example of a query tree in accordance with an implementation.

FIG. 4 shows an example of a query tree 400 which may be used to dictate the input from the user in accordance with an implementation. The structure of the query tree 400 may be implemented in a data structure and may be preprogrammed and/or stored in the non-transitory, computer-readable storage device 204. The query tree 400 comprises a plurality of levels and each level may comprise a plurality of leaf nodes. The example of the query tree 400 of FIG. 4 shows three levels. The top-most level includes leaf nodes 402, 404, and 406. Each leaf node 402-406 in the top-most level of the query tree may be associated a unique type of device. As shown in the example, leaf node 402 may pertain to a web application, while leaf nodes 404 and 406 may pertain to a mobile device and a desktop computer, respectively. The second level of leaf nodes in FIG. 4 pertains to the type of operating system (e.g., O/S 1 (408), O/S 2 (410), and O/S 3 (412) and the bottom-most level of leaf nodes may pertain to additional information about the application. Any number of levels may be implemented for the query.

For the server 106 to generate a technology recommendation for the user, the server 106 acquires various pieces of information about the intended application and does so by traversing through the query tree 400. The type of information inquired from the user at each level of the tree depends on the user's response to the preceding level of the tree. For example, at the top-most level of the query tree 400, the leaf nodes 402, 404 and 406 may be associated with a question soliciting the type of device on which the user would like to execute the software application to be developed, and the questions may be provided in the form of a multiple choice questionnaire. For example, the leaf node 402 may correspond to the device type as to be used on a website (e.g., web server). The leaf node 404 may correspond to the device type being a mobile device (e.g., smart phone), while the leaf node 406 may correspond to the device type being a desktop computer. Based on the user's answer to the question regarding device type at the top-most level of the query tree 400, the server 106 analyzes the answer and guides the user to the next level. For example, if the user would like to develop an application for a mobile device as the target device 104, the user so specifies to the server 106. Based on the chosen answer, the server 106 branches to the next level which may include three leaf nodes 408, 410 and 412 corresponding to three choices for a second question pertaining to the type of operating system to be run on the intended mobile device.

Subsequently, using the given example in FIG. 4, the second question corresponding to the leaf nodes 408, 410 and 412 may be associated with what kind of software platforms the user would like to use to execute the software application, and specifically the type of operating system.

Once the user specifies the intended operating system via leaf nodes 408-412, the server then guides the question-and-answer interaction with the user to the next level comprising leaf nodes 414 and 416. These particular leaf nodes are used to determine from the user what kind of server role the user would like to choose for the software application. More specifically, the leaf node 414 may correspond to a thin server, and the leaf node may correspond to a full stack server.

The query tree guides the process of learning about the characteristics that the user has in mind to develop the software application for the target device 104. The various characteristics may include device type, operating system, etc. The query tree guides the process in a systematic approach, with at least some questions depending on previous answers. If the server determines that enough information regarding developing the application has been collected, the server stops generating question, or simply leaf node. Based on analyzing all the answers to each of the leaf nodes in the query tree, the server provides the technology recommendation via searching the knowledge base.

Figure 5:
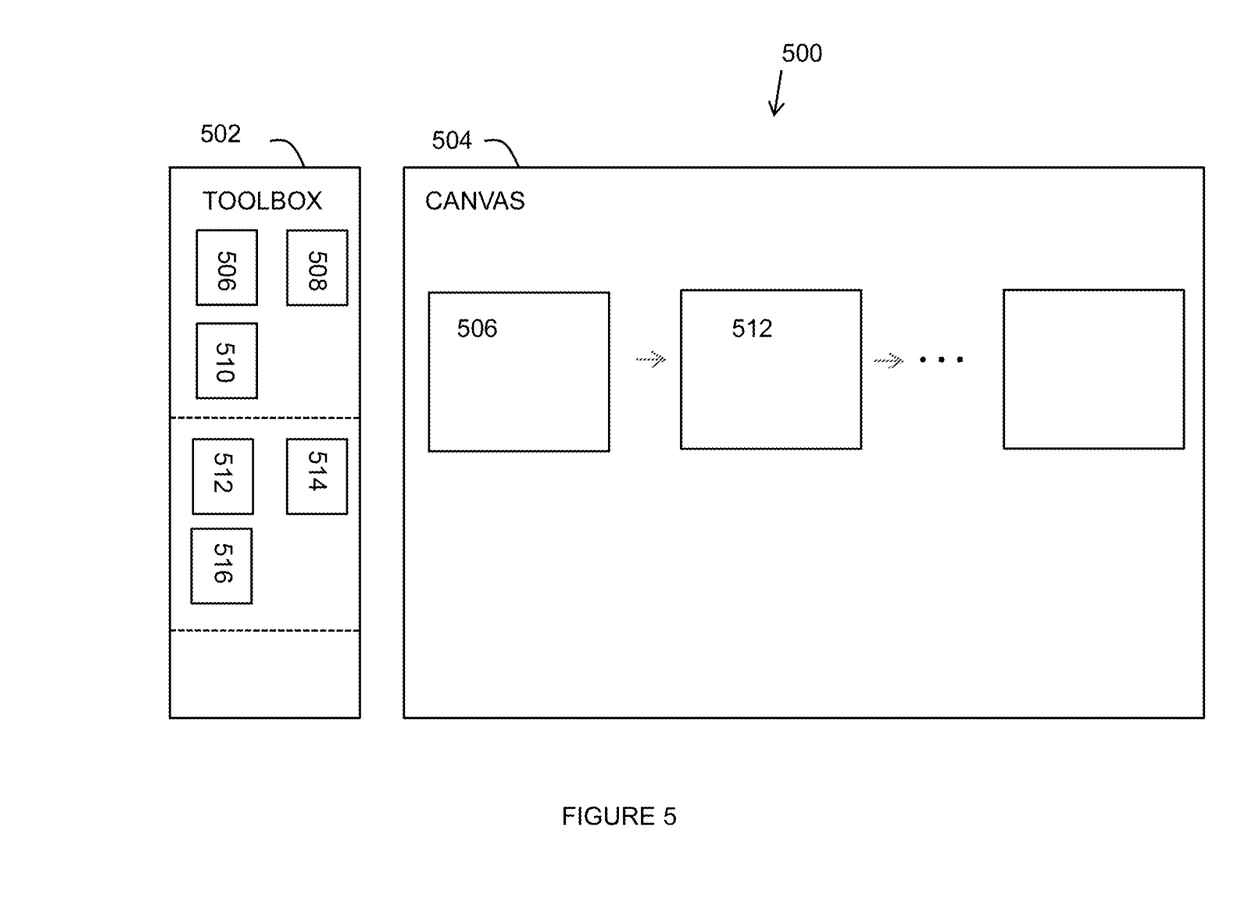
FIG. 5 shows a schematic example illustrating input via a graphical user interface (GUI) in accordance with an implementation.

Any of a variety techniques may be used to implement the logic of the query tree. For example, FIG. 5 shows a schematic example 500 illustrating input a user via a graphical user interface (GUI). The GUI may be implemented on the client device 102 or may be received at the client device 102 from, for example, server 106. The user may choose a plurality of blocks (e.g., 506, 508, 510) in a sequence from a toolbox 502 in a first window via the GUI, and drag the chosen blocks into a canvas 504 in a second window via the GUI. Each of the plurality of chosen blocks in the canvas 504 may correspond to a feature of the software environment specified by the user. The user may further specify detail in each block and connect each block to form a flow chart as shown in the example 500. For example, a first block 506, chosen by the user, in the canvas 504 may be associated with type of device in which the software application will be executed. The block 506 may only be chosen from a section in the toolbox 502, comprising a plurality of exemplary icons indicating respective functions such as web (block 508), mobile device (506) or personal desktop computer (510). A second chosen block 512 may be chosen by the user from a particular section including, for example block 512, block 514 and block 516 in the toolbox 502. This particular section may correspond to what kind of a software platform the user would like to use to execute the software application. Any subsequently chosen blocks in the canvas 504 may correspond to the user's further desires or requirements for developing the software application, which may include type of a server role, operating system, real time tracking, etc.

Still referring to FIG. 5, after the user completes drawing the flow chart in the canvas 504 as the input for the client device 102, the client device 102 transmits the flow chart to the server 106. For example, the client device 102 may generate a PDF file, containing the flow chart. The server 106 parses the flow chart and analyzes the flow chart as the software environment via searching the knowledge base 108 to provide the technology recommendation and transmits the technology recommendation to the client device 102.

Figure 6:
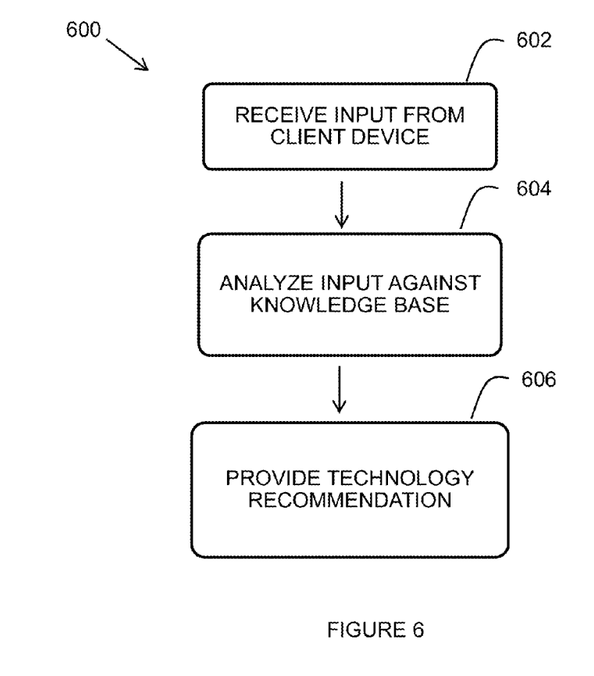
FIG. 6 shows a flow diagram for a method implemented in accordance with an example.

FIG. 6 shows a flow diagram for a method 600 implemented by the server 106 in accordance with various embodiments. As a result of executing the input reception module 206 by the processor 202, the method 600 begins at 602 with receiving input from a user at the client device 102 via, for example, a query tree or via a GUI where the input includes a plurality of blocks and each of the plurality of blocks specifies a feature of a software environment. In some examples, the input includes the software environment such as a type of device on which the software application to be developed is to execute and an operating system.

At 604, by executing the knowledge basis analysis module 210, the server 106 analyzes the input transmitted from the client device 102 by searching against the knowledge base 108 to generate a technology recommendation.

The method 600 continues at 606 with executing the technology recommendation module 212 to provide the technology recommendation to the client device 102. In some embodiments, the technology recommendation may include a software framework, a software development language, a software protocol, and a software platform.

Figure 7:
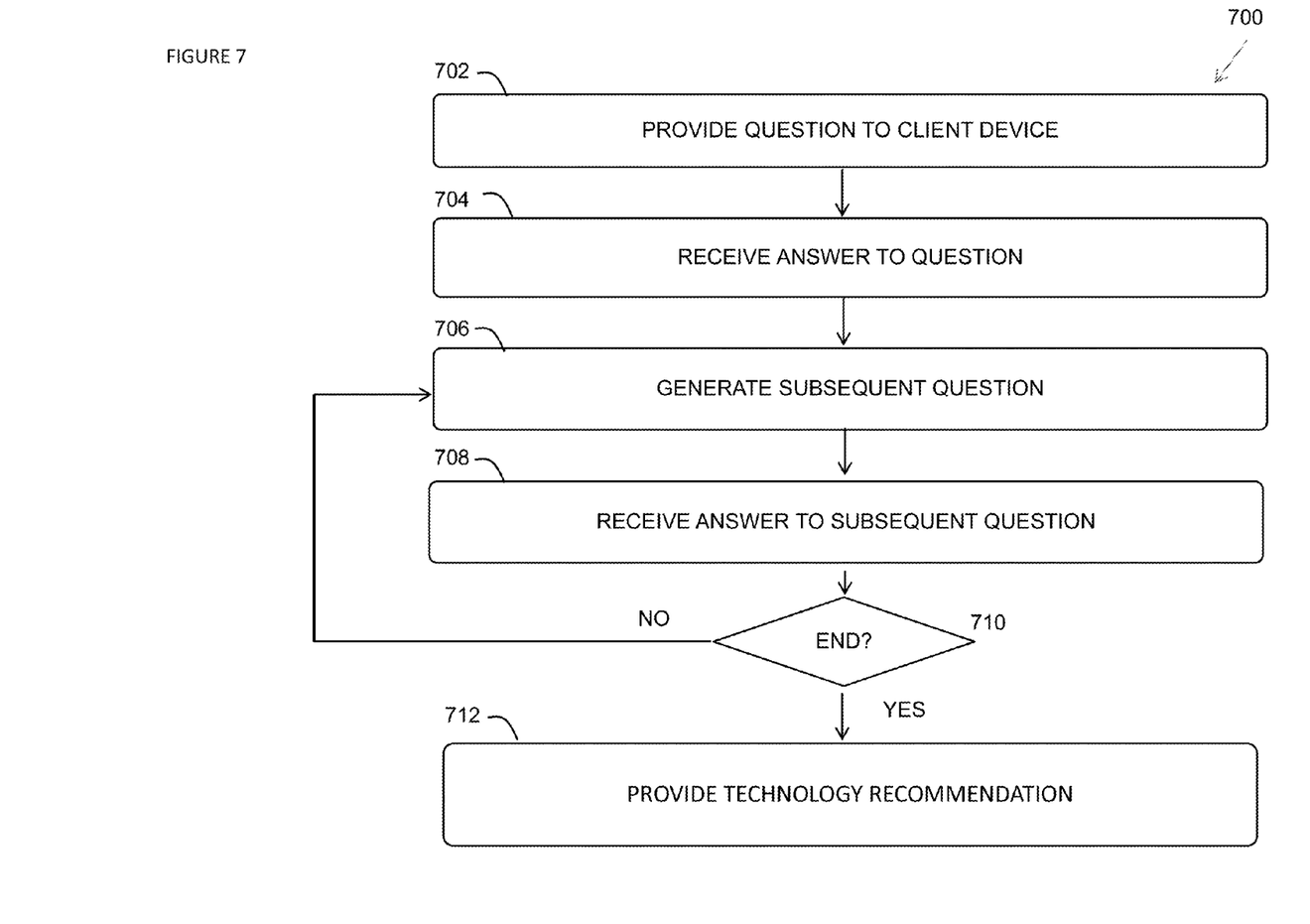
FIG. 7 shows a flow diagram for a method to receive input and provide a recommendation as implemented in accordance with an example.

FIG. 7 shows an example of flow diagram for a method 700 implemented by the server 106 to receive input from the client device 102. The method 700 begins in block 702 with providing, by the server 106, a first question to the client device 102. In block 704, the server 106 receives an answer to the question provided by the user, where the answer received on the client device 102 is transmitted to the server 108. The method 700 continues in block 706 with generating a second question, based on analyzing the user's answer to the first question through searching the knowledge base 108, for the user. In block 708, the server 106 receives an answer to the second question from the client device 102 and analyzes the answer to the second question and, in block 710, the server 106 determines if the server 108 has collected enough information regarding the software environment to develop the software application.

If the server 106 determines that enough information has been collected, the method 700 continues in block 712 with providing the technology recommendation. And the technology recommendation is transmitted to the client device 102. On the other hand, if the server 108 determines that not enough information has been collected, the flow chart loops back to block 706 to generate more subsequent questions.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
  receiving, by a computer, input from a client device, the input indicative of a software environment for a software application to be developed by a user;
  analyzing, by the computer, the received input against a knowledge base to generate a technology recommendation for the user to use to develop the software application, wherein the knowledge base encodes a query tree that specifies questions to be provided to the user to solicit the input indicative of the software application environment, wherein the query tree includes a plurality of leaf nodes, the leaf nodes associated with questions to solicit the input from the user related to a software platform, a server role, and a type of device on which the software application is to be executed;
  analyzing, by the computer, a path in the query tree by obtaining a first leaf node in a first level of the query tree, the first leaf node corresponding to a first question to provide to the client device; and
  providing, by the computer, the technology recommendation to the client device.

2. The method of claim 1 wherein the input indicative of the software environment received from the client device includes a type of device on which the software to be developed is to execute and an operating system for executing the software application.

3. The method of claim 1 wherein receiving the input comprises receiving the input via a graphical user interface (GUI) on the client device, the input including a plurality of blocks, wherein each block specifies a feature of the software environment.

4. The method of claim 1 wherein the technology recommendation comprises at least one of a software framework, a software development language, and a software platform.

5. The method of claim 1, further comprising:
  analyzing the first leaf node by searching the knowledge base; and
  based on an analysis of the first leaf node, accessing a second leaf node in a second level of the query tree, the second leaf node corresponding to a second question to provide the client device.

6. A non-transitory, computer readable storage device containing software that, when executed by a processor, causes the processor to:
  receive input from a client device, the input indicative of a software application environment for a software application to be developed by a user;
  analyze the received input against a knowledge base to generate a technology recommendation for the user to use to develop the software application, the technology recommendation specifying a programming language for the user to use to develop the software application, wherein the knowledge base encodes a query tree that specifies questions to be provided to the user to solicit the input indicative of the software application environment, wherein the query tree includes a plurality of leaf nodes, the leaf nodes associated with questions to solicit the input from the user related to a software platform, a server role, and a type of device on which the software application is to be executed;
  analyze a path in the query tree by causing the processor to obtain a first leaf node in a first level of the query tree, the first leaf node corresponding to a first question to provide to the client device; and provide the technology recommendation to the client device.

7. The non-transitory, computer readable storage device of claim 6, wherein the software causes the processor to:
analyze the first leaf node by searching the knowledge base; and
based on an analysis of the first leaf node, access a second leaf node in a second level of the query tree, the second leaf node corresponding to a second question to provide the client device.

8. The non-transitory, computer readable storage device of claim 6 wherein the technology recommendation further specifies a software framework and a software protocol to be used to develop the software application.

9. The non-transitory, computer readable storage device of claim 6 wherein the input includes a skill level of the user.

10. A server comprising:
a processor; and
a non-transitory computer readable medium storing instructions that when executed by the processor cause the processor to:
receive input from a client device, the input indicative of a software application environment for the software application to be developed by a user;
analyze the received input against a knowledge base to generate a technology recommendation for the user to use to develop the software application, wherein the knowledge base encodes a query tree that specifies questions to be provided to the user to solicit the input indicative of the software application environment, wherein the query tree includes a plurality of leaf nodes, the leaf nodes associated with questions to solicit the input from the user related to a software platform, a server role, and a type of device on which the software application is to be executed;
analyze a path in the query tree by causing the processor to obtain a first leaf node in a first level of the query tree, the first leaf node corresponding to a first question to provide to the client device; and
provide the technology recommendation to the client device.

11. The server of claim 10, wherein the instructions are to cause the processor to:
analyze the first leaf node by searching the knowledge base; and
based on an analysis of the first leaf node, access a second leaf node in a second level of the query tree, the second leaf node corresponding to a second question to provide the client device.

12. The server of claim 10, wherein the technology recommendation further specifies a software framework, a software protocol, and a programming language to be used to develop the software application.

* * * * *